(12) United States Patent
Reid et al.

(10) Patent No.: US 7,690,687 B2
(45) Date of Patent: Apr. 6, 2010

(54) TRAILER MOUNTED ATTENUATOR WITH BREAKAWAY AXLE ASSEMBLY

(75) Inventors: John D. Reid, Lincoln, NE (US); John R. Rohde, Lincoln, NE (US); King K. Mak, San Antonio, TX (US); Dean L. Sicking, Houston, TX (US)

(73) Assignee: Safety By Design Co., Lincoln, NE (US)

( * ) Notice: Subject to any disclaimer, the term of this patent is extended or adjusted under 35 U.S.C. 154(b) by 1087 days.

(21) Appl. No.: 11/035,869

(22) Filed: Jan. 10, 2005

(65) Prior Publication Data

US 2006/0151986 A1   Jul. 13, 2006

(51) Int. Cl.
*B62D 7/22* (2006.01)
(52) U.S. Cl. .................. 280/784; 280/789; 280/756; 280/292; 280/406.2
(58) Field of Classification Search .................. 280/784, 280/789, 656, 292, 406.2, 407, 408; 188/374, 188/375, 377
See application file for complete search history.

(56) References Cited

U.S. PATENT DOCUMENTS

| 4,807,894 | A | * | 2/1989 | Walker | 280/63 |
| 4,823,923 | A | * | 4/1989 | Moyer | 188/376 |
| 5,137,297 | A | * | 8/1992 | Walker | 280/414.5 |
| 5,875,875 | A | * | 3/1999 | Knotts | 188/374 |
| 5,947,452 | A | * | 9/1999 | Albritton | 256/13.1 |
| 6,273,435 | B1 | * | 8/2001 | Stringer | 280/6.151 |
| 6,308,809 | B1 | * | 10/2001 | Reid et al. | 188/377 |
| 6,505,820 | B2 | * | 1/2003 | Sicking et al. | 256/13.1 |
| 6,668,989 | B2 | * | 12/2003 | Reid et al. | 188/377 |
| 6,783,116 | B2 | * | 8/2004 | Albritton | 256/13.1 |
| 7,111,827 | B2 | * | 9/2006 | Sicking et al. | 256/13.1 |
| 7,125,032 | B2 | * | 10/2006 | Hopper | 280/414.1 |
| 7,147,088 | B2 | * | 12/2006 | Reid et al. | 188/377 |
| 7,246,791 | B2 | * | 7/2007 | Alberson et al. | 256/13.1 |
| 7,257,445 | B2 | * | 8/2007 | Bruchmann et al. | 607/36 |
| 7,341,397 | B2 | * | 3/2008 | Murphy | 404/6 |

* cited by examiner

*Primary Examiner*—Toan C To
(74) *Attorney, Agent, or Firm*—Jackson Walker, LLP

(57) ABSTRACT

A trailer mounted crash attenuation system has an impact head assembly, a bursting tubular trailer frame member, and a breakaway axle assembly. Upon impact by a vehicle, the head assembly is urged forward bursting the tubular frame of the trailer. As the impact continues, the head assembly contacts an axle accelerator rod which results in the disengagement of the axle, trailer tire, and fenders from the trailer frame member. Impact energy is dissipated by the controlled deceleration of the vehicle as it moves forward through the attenuator system.

19 Claims, 9 Drawing Sheets

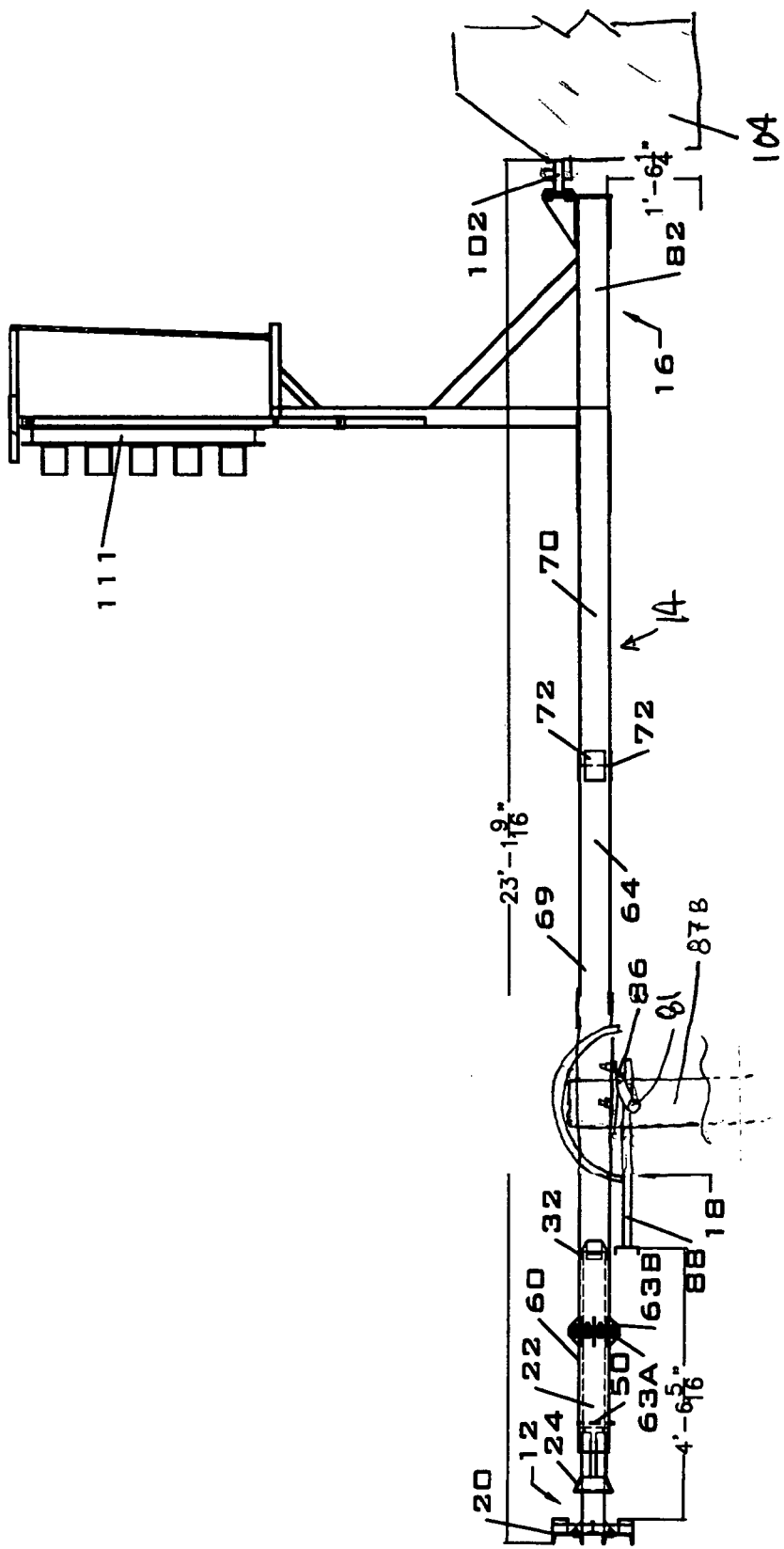

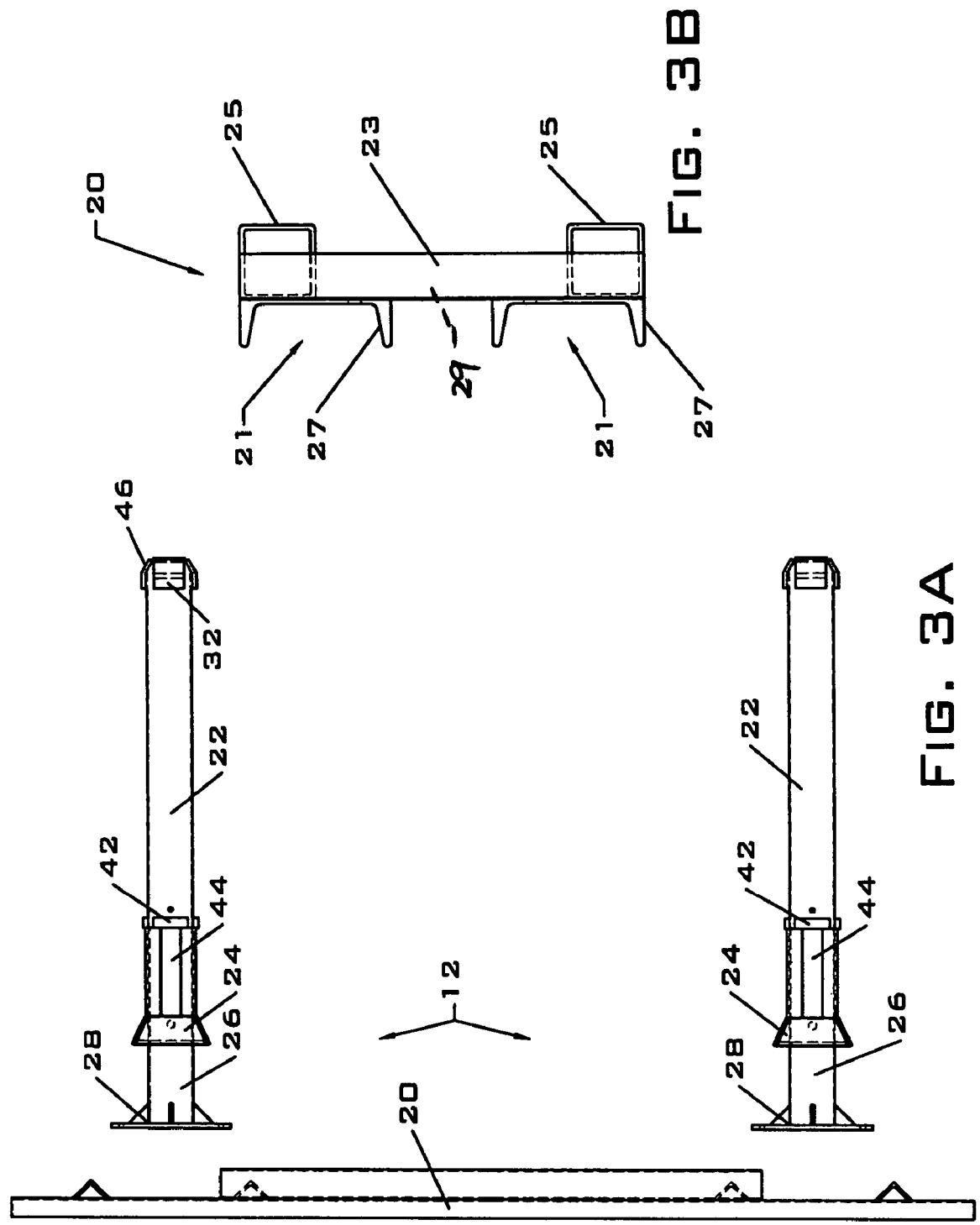

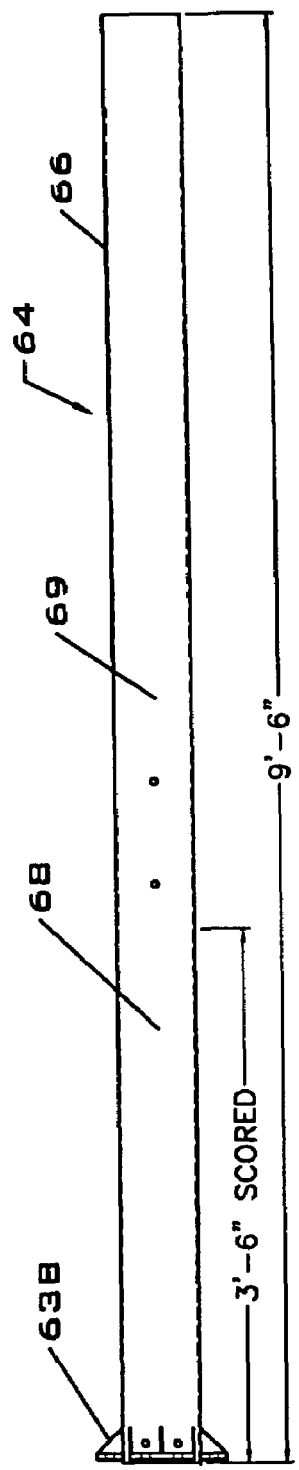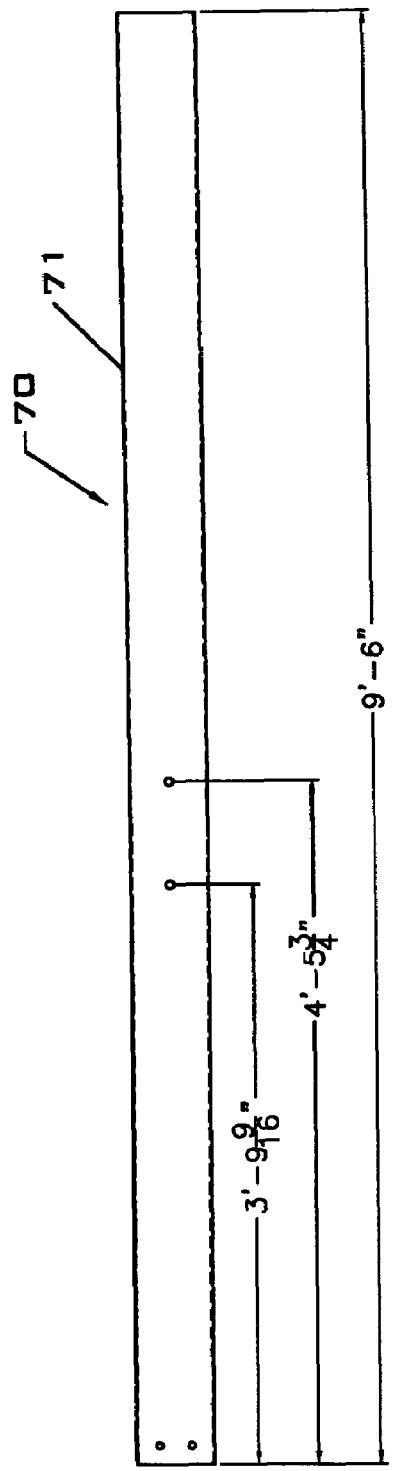

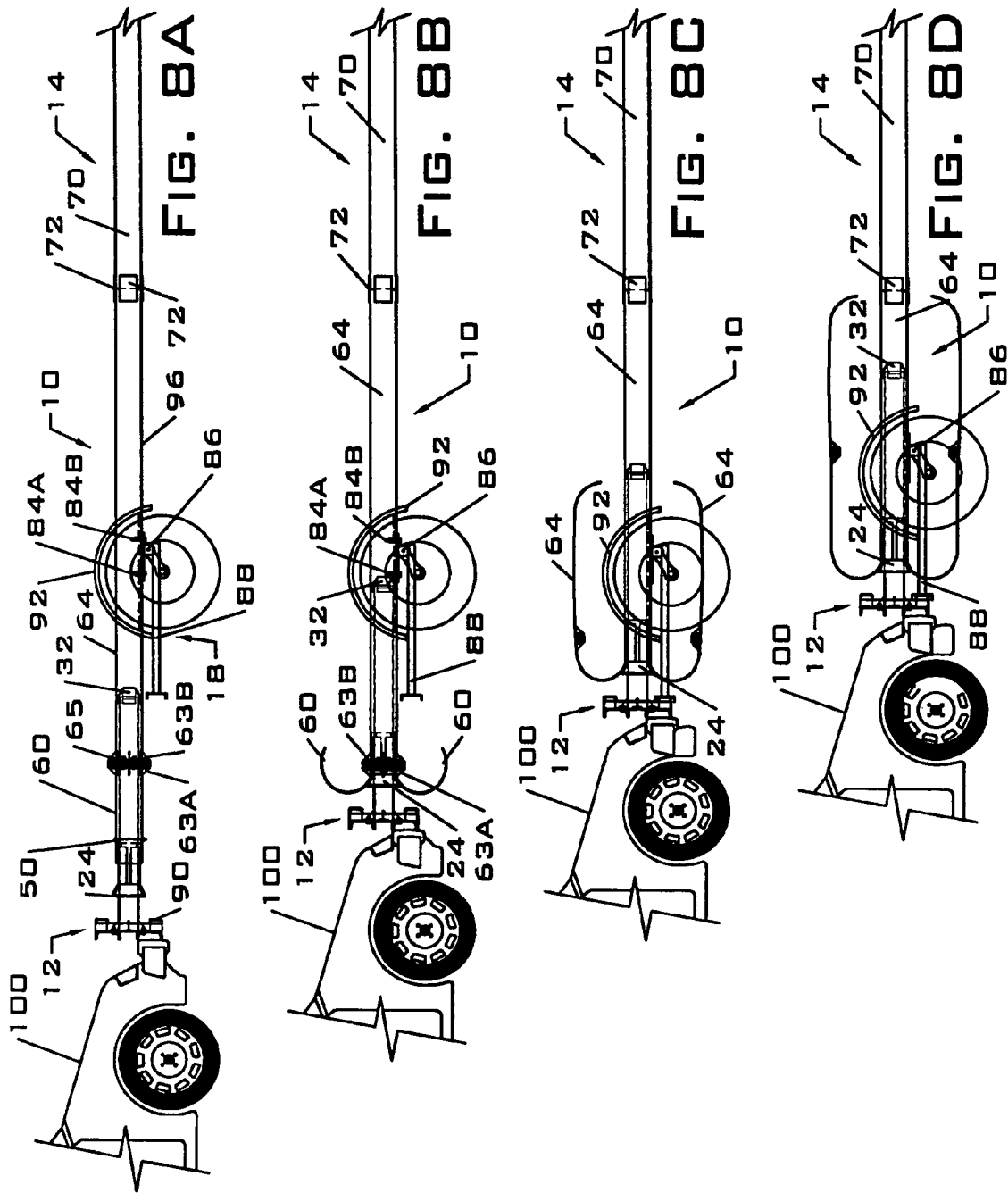

TRAILER MOUNTED ATTENUATOR WITH BREAKAWAY AXLE ASSEMBLY

BACKGROUND OF THE INVENTION

Highway maintenance vehicles are often parked near roadways or move slowly in or adjacent to high-speed traffic lanes. In these situations, maintenance vehicles pose a serious hazard to the motoring public and the workers. The safety risk associated with these work vehicles is normally minimized through the use of a truck mounted attenuator (TMA).

A TMA is essentially a crash cushion that is cantilevered off of the back of the support truck. The combination of a cantilevered mounting structure and the length of most TMAs produce the potential for large oscillations in the vertical position of the attenuator as the support truck moves down the highway. In other words, the attenuator bounces up and down. These oscillations produce two problems, fatigue loading of TMA components and the potential for the end of the TMA to strike the roadway surface. Support elements and every connection in the structure of a conventional TMA must be strengthened to resist the long term fatigue loading induced by the vibratory oscillations in the unit. Further, in order to prevent large oscillations that could allow the back of the TMA to strike the pavement, support trucks must be driven at a very low speed when the TMA is in use. This speed limitation forces the TMA to be mounted to the support truck with a lifting system that raises the unit to a near vertical position when it is no longer needed.

The support structures and lifting systems used with most TMAs must be securely attached to the work vehicle, thereby preventing the unit from being easily detached from the truck. As a result, TMA support trucks often become dedicated vehicles that can only be used as shadow vehicles to protect motorists from roadway maintenance activities.

SUMMARY OF THE PRESENT INVENTION

The basic concept behind the present inventive trailer mounted attenuation (TTMA) is to have the attenuator mounted on a trailer that can be attached to a truck's pintle hook. This inventive concept eliminates the two primary deficiencies of traditional TMAs. Since the center of the present inventive attenuator is supported by the trailer's axle, vertical oscillations in the attenuation system can be controlled, even when the trailer is towed at highway speeds. As a result, the fatigue problem associated with most TMA systems may be avoided completely. Also, there is no need for costly mounting systems that lift the TMA to a vertical position for transport. Further, the trailer improves the maneuverability of the vehicle as compared to a TMA in the down (deployed) position. Since the trailer is attached to the truck's pintle hook, removing the attenuator to allow the truck to be used for other purposes is as simple as unhitching the trailer.

The primary problem with any trailer attenuation systems is the propensity for the attenuator to be knocked laterally out of the path of the impacting vehicle, such as when a vehicle strikes the end of the trailer at an angle or during offset impacts where only a portion of the front of an impacting vehicle strikes the end of the trailer. This problem can be overcome through the use of engagement elements on the impact end of the trailer. The engagement elements must intrude into the front of an impacting vehicle and prevent it from sliding sideways along the face of the trailer. If the impacting vehicle is restrained from sliding along the trailer's impact face and the attachment between the trailer and the pintle hook is adequate, the trailer cannot be knocked laterally out of the vehicle's path. The engagement elements also allow the trailer to be attached to a conventional pintle hook on the back of a tow trailer. This method for attaching a trailer to a tow vehicle does allow rotation at the point of attachment. However, the mechanical interlock produced by the engagement elements limits the rotation, thus eliminating the need for an advanced hitch design.

The present inventive trailer mounted attenuator incorporates engagement elements on each side of the impact face to prevent lateral movement of the trailer during an impact. These engagement elements are fabricated from steel channels with the legs of the channels facing the impacting vehicles. Alternative engagement elements may include studs or small metal tabs that extend outward from the impact face, or openings in an impact face sufficiently large to allow components of the vehicle to slide into the opening. In essence, any structure that either penetrates into the front of the impacting vehicle or allows a portion of the impacting vehicle to protrude through an opening to provide a mechanical interlock, can serve as an engagement element.

The present trailer mounted attenuator also utilizes an energy absorbing mechanism that crushes, bursts, cuts, or otherwise shortens the longitudinal railing elements used to construct the trailer. The present device incorporates a beam bursting energy absorber. The beam bursting energy absorbing concept is described in U.S. Pat. Nos. 6,308,809; 6,457,570; and 6,668,989 (all of which are incorporated herein by reference for all purposes) and incorporates an oversized, tapered mandrel that is placed inside of a steel tube. When the mandrel is pushed down the tube by an impacting vehicle, the sides of the tube are ruptured to dissipate energy. The ruptured portion of the rail is then deflected backward away from the impacting vehicle. Alternative energy absorbing systems could incorporate cutting technologies such as those described in U.S. Pat. Nos. 5,391,016; 6,022,003; and 6,505,820. The sides of the present inventive trailer may also be manufactured from a series of telescoping tubes with internal energy absorbers, such as those described in U.S. Pat. No. 5,391,016. In this latter case, the side rails of the trailer collapse as each segment of the railing telescoped over the segment behind it. These tubes may buckle sequentially from the impact end to dissipate energy. Fiber reinforced plastic (FRP) elements may also be used to substitute for metal elements whenever possible.

Additionally, the present system also has a breakaway axle that allows the energy dissipation system to continue functioning beyond the axle of the trailer. A breakaway axle system allows the entire trailer to be utilized in the energy management system and allows the axle to be placed anywhere along the trailer length to provide optimum towing behavior. Another feature of the present invention is an axle accelerator or push assembly attached to the breakaway axle. Full scale crash testing has shown that when the front of a vehicle or a trailer's impact plate contacts trailer wheels, the trailer tires compress and begin to slide along the pavement. This behavior creates two potentially serious problems: excessive decelerations and the potential for vehicle roll or pitch over. The high impact forces generated when the tires are compressed produce high frictional forces on the pavement and greatly increase the decelerations applied to the impacting vehicle. Further, when the tires eventually unload, they can lift the front of the impacting vehicle high into the air, which may lead to vehicle instability. The risk of vehicle instability may be greatly increased if the front of the vehicle contacted only one of the two trailer tires. This may induce a rollover when only one side of the car was pushed upward. The axle accelerator of the present invention is designed to contact the impact face of the trailer as it proceeds toward the axle to prevent the impact plate or the front of the impacting vehicle from contacting the trailers tires. The axle accelerator assembly may be adjusted to control the timing of the impulsive loading on the impacting vehicle associated with the accelerating the trailer's axle.

It is important to control the path of an axle after it has been broken free of the trailer and accelerated through contact with the trailer's impact face or the impacting vehicle. The present invention utilizes fenders which extend up to the sides of the trailer rail elements to control the path of the axle. The fenders keep the axle under the trailer and force it to the front of the trailer after it breaks away. The axle is brought to a stop when it contacts the rear of the tow truck.

The present inventive trailer attenuator system may also be designed with sacrificial energy absorbing segments to minimize repairs needed after low-speed impacts or minor crashes that may occur while the tow vehicle is backing up. In order to attain this feature, the ends of the sacrificial segments are designed to be bolted onto the back of the trailer. If a minor impact occurs that does not extend through the bolted rear section, the sacrificial segment is removed and a new sacrificial energy absorbing section is bolted in its place. This feature will greatly reduce the cost of repairing nuisance impacts on the end of the attenuator.

An arrow board or other signaling traffic control device may be attached to the present attenuator. The front of the trailer may be extended to include a variable message sign or a flashing arrow board to warn traffic of the slow moving operation. Because the present inventive system can be attached to a heavy tow vehicle, the total velocity change of the trailer can be very low. Hence, there is no need to design the sign support structure to withstand high acceleration forces imparted when a vehicle impacts a light trailer. By incorporating a flashing arrow board or a variable message sign, the present attenuator may completely eliminate the need for adding traffic warning or informational systems to the shadow vehicle. In this manner, the need to dedicate a truck for exclusive use as a shadow vehicle may be completely eliminated.

The present invention may also be used to protect salting, sanding, and snow plowing operations during winter driving conditions. In comparison, convention TMA's obstruct sanding and salting operations completely. The present invention may incorporate a long tongue of 4 feet of more that will allow salting or sanding operations to continue while the attenuation trailer is attached to the vehicle. Further, the long trailer tongue may be lowered to avoid interference with salting or sanding equipment. Alternatively, a very open trailer tongue system may be incorporated if necessary to limit interference with these operations. The present invention may also be utilized in snow plowing operations where plows often operate at speeds in excess of those allowed by conventional TMA devices. Further, the present attenuator may be equipped with a flashing arrow or variable message sign board, thus improving the visibility of the work vehicle and providing additional warning to motorists of the salting, sanding and snow plowing operations.

While the concept of a trailer attenuation system has been taught in the past as described in U.S. Pat. No. 5,947,452, the trailer system shown in U.S. Pat. No. 5,947,452 is based on the concept of allowing the sides of the trailer system and its support axles and wheels to roll under the tow vehicle. (See U.S. Pat. No. 5,947,452, FIGS. 4 through 6).

This is a serious limitation that requires the trailer to be attached only to vehicles with sufficient ground clearance to allow the trailer structure and wheels to roll under the vehicle. Further, even when attached to a truck with high ground clearance, the trailers impact performance would be adversely affected if the sides of the trailer contacted discontinuities in the roadway, such as pot holes or cracks in roadway. This trailer would also be adversely affected if the trailer was struck when it was not perfectly aligned with the tow vehicle. In such an instance, the sides of the trailer would be likely to encounter one of the wheels of the tow vehicle which would inhibit the energy dissipation mechanism.

Another major advantage of the present inventive system is that the apparatus may be converted into a temporary crash cushion. The trailer attenuator may be towed to a specified location and unhitched from the towing vehicle. The attenuator may then be hitched to a fixed position object or rigid obstacle. Again the combination of engagement elements on the impact face of the attenuator and a strong attachment between the trailer hitch and the roadside hazard may prevent the trailer from rotating out of the path of an oncoming vehicle. In such an application, the present attenuator may safely attenuate impacts on the end of the trailer, but it is less effective in safely redirecting vehicles striking the side of the system. Additionally, the tires of the trailer attenuator may be removed from the axle assembly and the axle assembly attached to support port driven into the ground. Subsequently, the trailer may be detached from the post, the tires remounted, the trailer unhitched from the fixed object, and the trailer towed away.

However, the present inventive attenuator may be quickly modified to accommodate impacts along the side of the trailer and thereby making the crash cushion a non-gating system. By removing the axle and driving breakaway posts into the ground behind the trailer, it may be made to provide adequate safety protection for both end-on and side impacts with the trailer. Because the trailer utilizes its own frame elements as energy absorbers, it can provide this anchored attenuator application.

It should be noted that during offset or oblique impacts with the present attenuator system, large forces are applied to the trailer that may distort the trailer frame. Diagonal cable bracing may be added to the basic frame to control frame distortion during these impacts. This type of bracing is also helpful during impacts on the side of the attenuator when it is installed as a redirective crash cushion. However, because the cable bracing does not carry compressive loads and the frame members are used as the primary attenuation mechanism, this type of frame reinforcement does not affect the attenuation capacity of the present inventive attenuator.

BRIEF DESCRIPTION OF THE DRAWINGS

FIG. 2B shows a side elevation view of an alternative embodiment with the tires removed and driven posts mounted to the wheel journals.

FIG. 3A illustrates a partially exploded top plan view of the impact head assembly and the mandrel tubes of the present invention.

FIG. 3B shows a side elevation view of the impact plate of the present invention.

FIG. 6 shows a side elevation view of the second, two level, energy absorbing tube of the present invention.

FIG. 7 shows a side elevation view of the third energy absorbing tube of the present invention.

FIG. 8A illustrates a first non-impact position of the present invention.

FIG. 8B shows a sequence illustration after the attenuator system has been impacted by a vehicle.

FIG. 8C continues to illustrate an impact sequence wherein the breakaway axle assembly is being contacted.

FIG. 8D is a final illustration of an impact sequence with the present invention

DETAILED DESCRIPTION OF THE PREFERRED EMBODIMENT

Figure 1:
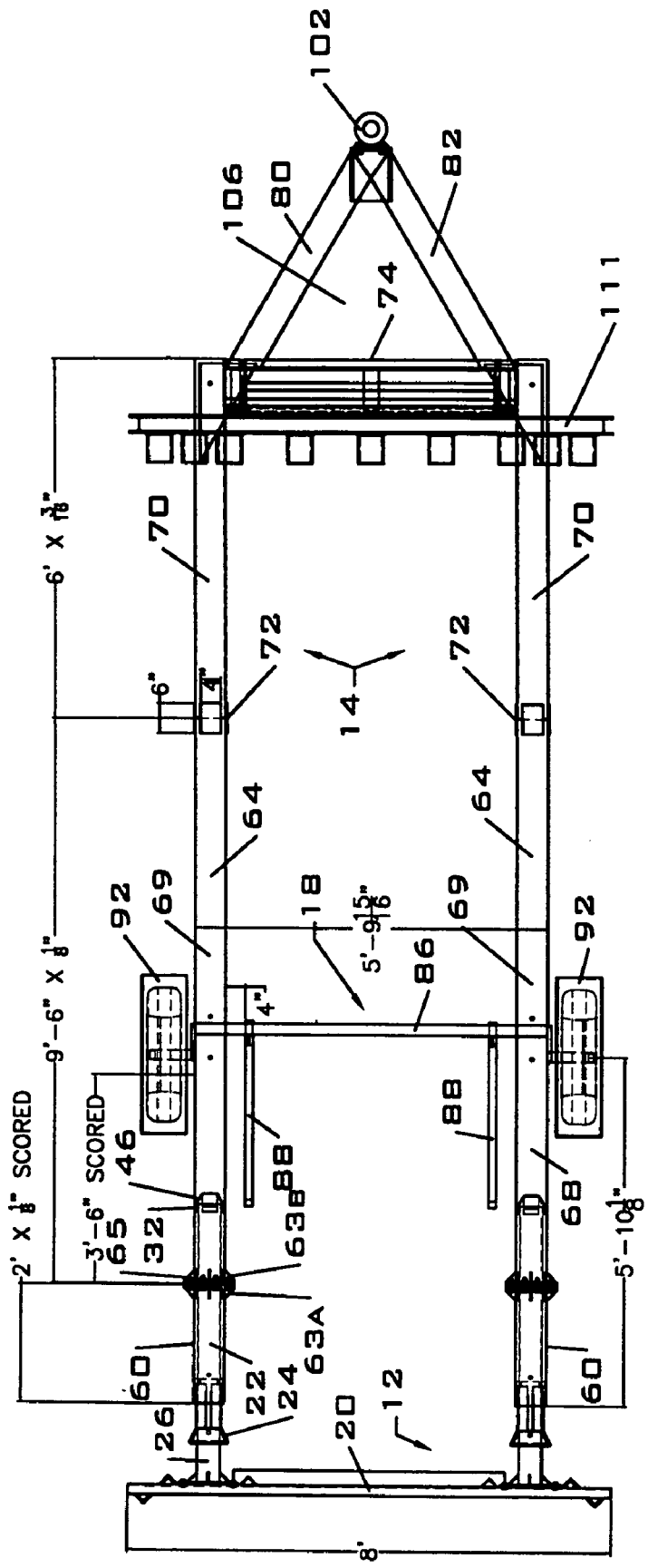
FIG. 1 illustrates a top plan view of the trailer mounted attenuator system of the present invention.
Figure 2A:
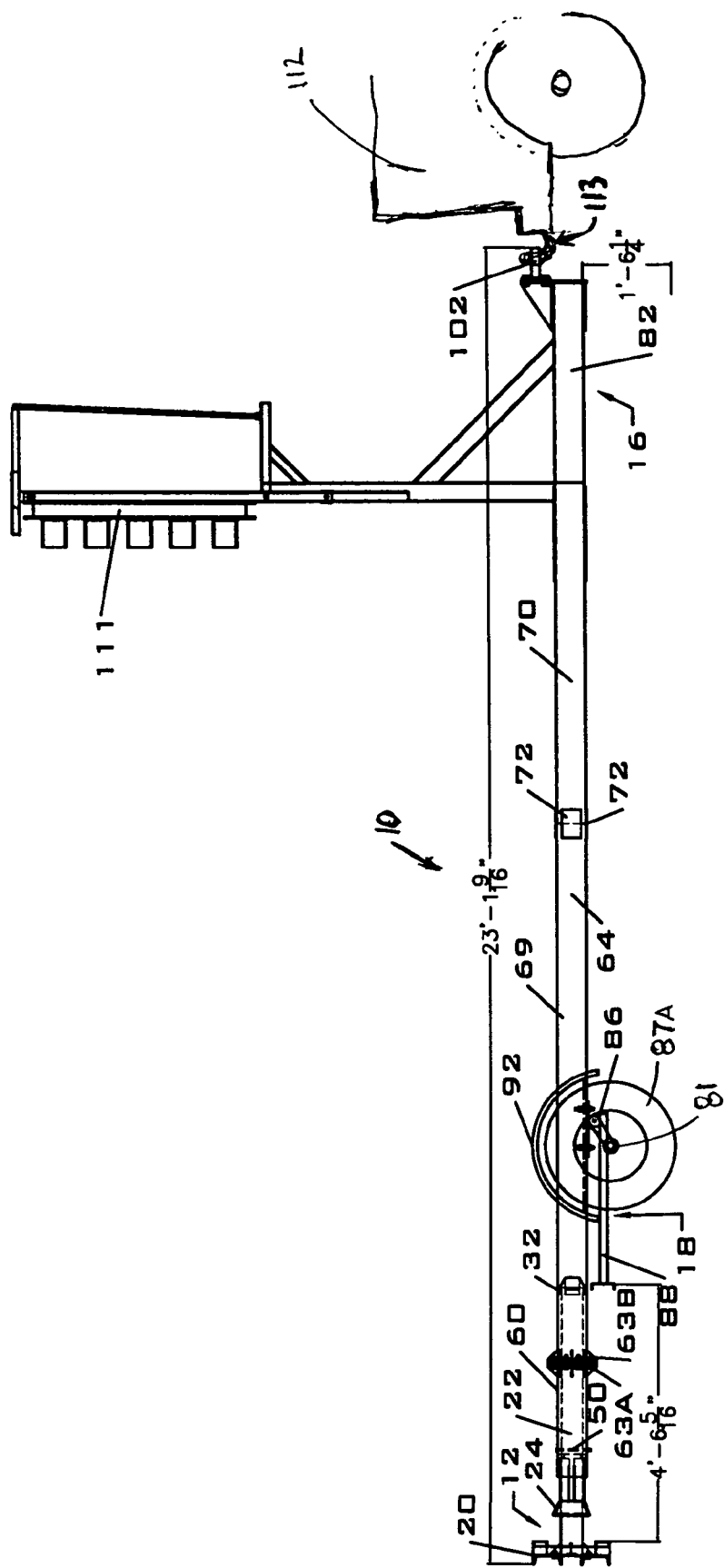
FIG. 2A shows a side elevation view of the attenuator system of FIG. 1 attached to a towing vehicle.

As seen in FIGS. 1 and 2A and 2B the present inventive trailer mounted attenuator (10) has an impact head assembly (12); a trailer frame (14); a hitch assembly (16); and a breakaway axle assembly (18). FIG. 2A illustrates the journals (81) of the breakaway axle assembly (18) affixed to a conventional wheel set or tire arrangement (87A), and the hitch (102) connected to a towing vehicle (112). FIG. 2B shows the axle assembly (18) affixed to a driven post (87B) and the hitch (102) attached to a fixed object or barrier (104). The post (87B) may be driven into the ground and attached to the assembly (18) anywhere along the length of axle (86) or at the journals (81). Signage (111) may be mounted to the attenuator as required.

The overall length of the TTMA (10) is 8384 mm (23 ft-1 9/16 in.). The maximum width of the trailer assembly is 2438 mm (8 ft.) at the impact head assembly. The height from the ground to the bottom of the trailer frame is 464 mm (18 1/4 in.). It should be understood that the physical dimensions of the trailer may vary depending on such specific requirements as the capacity of the attenuator, vertical and longitudinal clearance needed for the intended application, etc.

FIG. 3A illustrates an exploded top plan view of the impact head assembly (12). The impact head assembly (12) consists of: a front impact plate (20), two mandrel tubes (22) that insert into the energy absorbing tubes (64), and two tapered mandrels (24). The front impact plate (20) has overall dimensions of 2438 mm×406 mm (8 ft.×16 in.). The impact plate (20) (see FIG. 3B) is fabricated from two C-channels (21) 152×12.2 mm (C 6×8.2 in.) as horizontal members connected with L-angles (23) 51×51×6.4 mm (2×2×1/4 in.) as vertical supports on the backside at the two ends. The channels are also stiffened on the backside with 76×76×4.8 mm (3×3×3/16 in.) structural tubes (25). The impact plate distributes the impact load while the 51 mm (2 in.) wide protruded edges (27) of the channels provide and the openings (29) formed between the horizontal channels (21) and the L-angle (23) a mechanical interlock with the impacting vehicle.

Two mandrel tubes (22) are attached to the back of the channels (21) with 9.5 mm (3/8 in.) diameter, 38 mm (1 1/2 in.) long Grade 5 bolts (not shown). Each mandrel tube (22) is fabricated from a 1422 mm (4 ft. 8 in.) long section of 114× 114×3.2 mm (4.5×4.5×1/8 in.) ASTM A500 Grade B structural tubing. The upstream end (26) of the mandrel tube is welded to the back of a 305×229×12.6 mm (12×9×1/2 in.) base plate (28) and reinforced with gusset plates. The base plate has four 12.6 mm (1/2 in.) diameter holes for bolting to the back of the impact plate. A tapered mandrel (24) fabricated from 9.5 mm (3/8 in.) thick plates, is welded to the tube 200 mm (7 7/8 in.) downstream of the base plate. The cross-sectional dimension of the mandrel increases from 133 mm×133 mm (5.25 in.× 5.25 in.) to a maximum of 198×198 mm (7.8 in.×7.8 in.). The inside dimensions of the cooperating energy absorbing tube is 146 mm×146 mm (5.75 in.×5.75 in.).

The downstream end (32) of the mandrel tube (22) is inserted into the upstream end (34) of the energy absorbing tube (64) for a distance of approximately 1016 mm (40 in.). Guide angles (42), fabricated from 38×38×9.6 mm (1.5×1.5× 3/8 in.) angles, and guide plates (44), 9.6 mm (1/4 in.) in thickness, are welded around the tube immediately downstream of the mandrel to control the clearance of the mandrel tube within the energy absorbing tube. The downstream end (32) of the guide tube has a tapered end (46), fabricated by welding 9.6 mm (3/8 in.) thick bent plates to the tube, which acts like a plunger to shear off bolts at connections and hinges. A 6 mm (1/4 in.) diameter, 165 mm (6 1/2 in.) long Grade 5 bolt (50) is used to hold the mandrel tube (22) in place (see FIGS. 2A, 2B and 8A). Upon impact, this bolt is sheared off, thus allowing the front impact plate with the mandrel tubes to be pushed forward and the mandrels to engage with the upstream ends of the energy absorbing tubes.

The trailer frame (14), details of which are shown in the FIGS. 4 through 7, has three sections of energy absorbing tubes:

[A] The first stage energy absorber (60) is a 610 mm (24 in.) long section of TS 152×152×3.2 mm (6×6×1/8 in.) ASTM A500 Grade B structural tubing (61) (see FIG. 5). The entire tubing section is scored in order to control the bursting force (as described in U.S. Pat. No. 6,457,570 incorporated herein by reference for all purposes). For minor impacts and nuisance hits, only this first section (60) is damaged and needs to be replaced, thus minimizing the repair cost. This first stage energy absorber is bolted at flange connection (63a) to the second stage energy absorber (62) at flange connection (63b) with eight 14.3 mm (9/16 in.) diameter Grade 5 bolts (65) to facilitate ease of replacement.

[B] The second stage energy absorber (64), 2594 mm (9 ft. 6 1/8 in.) in length, is also fabricated from TS 152×152× 3.2 mm (6×6×1/8 in.) ASTM A500 Grade B structural tubing (66) (see FIG. 6). The second stage energy absorber (64) has two levels of energy absorption. The first 1067 mm (42 in.) long section (68) of the stage 1 energy absorbing tube is scored to control the bursting force. The remaining section (69) is not scored to provide a higher bursting force.

[C] The third stage energy absorber (70) is 1834 mm (6 ft. 3/16 in.) long, fabricated from TS 152×152×4.8 mm (6×6×3/16 in.) ASTM A500 Grade B structural tubing (71) as shown in FIG. 7. The second stage energy absorber (64) is welded to the third stage energy absorber (70) with four 152×102×6.4 mm (6×4×1/4 in.) joint plates (72), one on each side of the tube (70).

Figure 4:
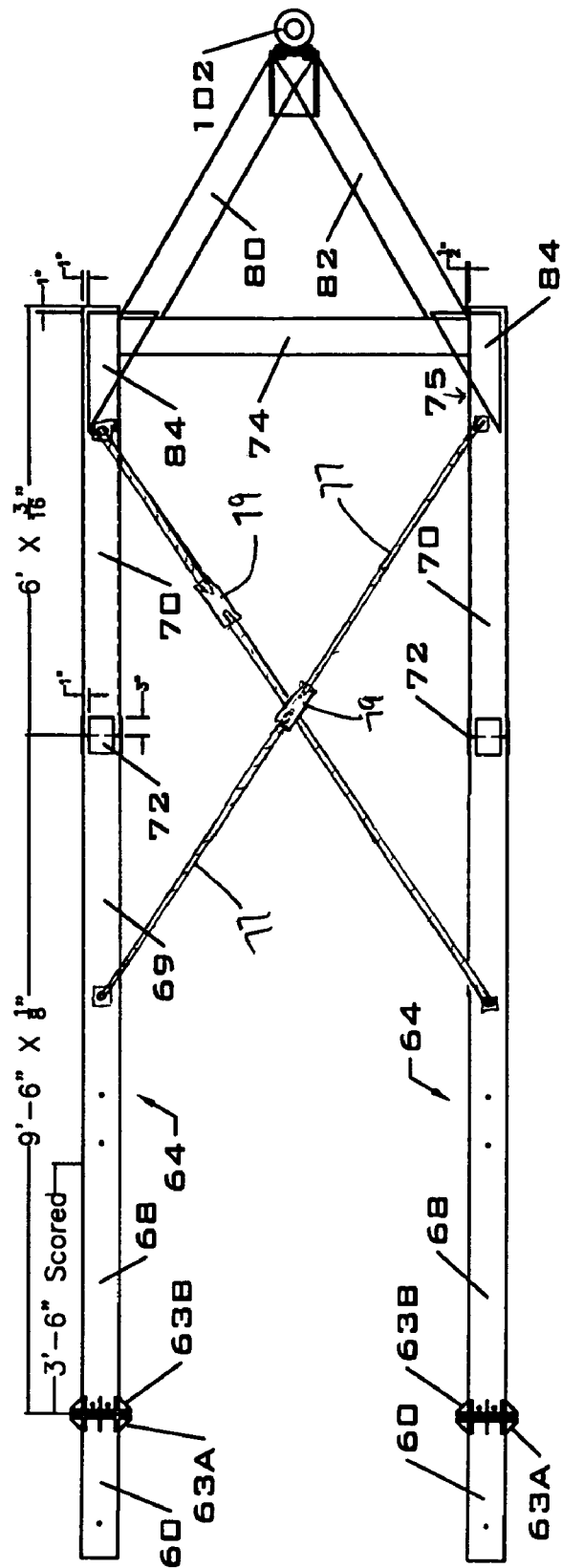
FIG. 4 is a top plan view of the trailer frame assembly of the present invention.
Figure 5:
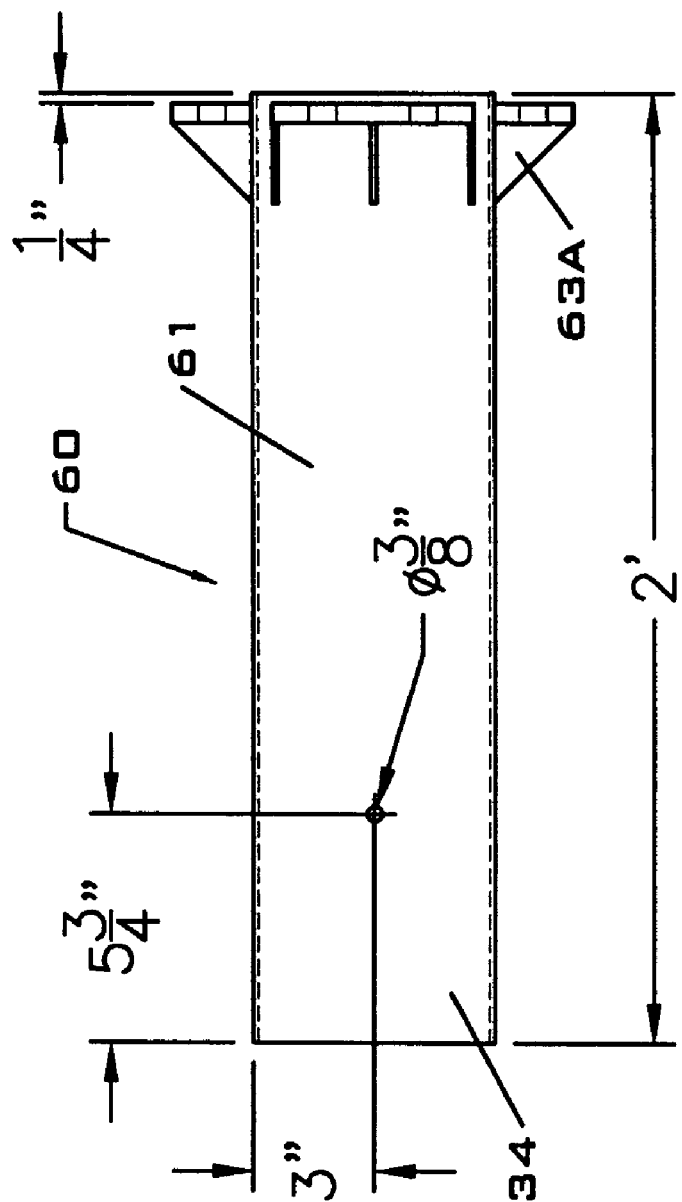
FIG. 5 is a side elevation view of the first "sacrificial" energy absorbing tube of the present invention.

Turning again to FIG. 4 it may be seen that a cross member (74) is welded to the downstream ends (75) of the third stage energy absorbing tubes (70) to form the trailer frame. Two diagonal hitch tubes (80 and 82) are in turn welded to the cross member (74) of the hitch assembly (16), as shown in FIG. 4. The cross member (74) and hitch tubes (80 and 82) are fabricated from TS 152×152×4.8 mm (6×6×3/16 in.) ASTM A500 Grade B structural tubing. The connections are further reinforced with welded gusset plates (84). The structure of the hitch assembly (16) provides an opening (106) though sand and/or salt may pass through as it is being discharged from a towing vehicle. The hitch assembly (16) including the hitch member (102), therefore does not generally impede the flow of materials which may be dispense or spread on a road surface as the attenuator (10) is being towed.

In order to handle offset or oblique impacts, diagonal cables (77) with turnbuckles (79) may be added to the frame (14) to control frame distorture during such offset impacts. FIG. 4 illustrates such a diagonal cable configuration.

A breakaway axle assembly (18), as shown in FIGS. 1, 2A, 2B and 8A-8D, attaches to the trailer assembly (14). The commercially available axle assembly is attached to the bottom of the second stage energy absorbing tubes (64) with four 16 mm (5/8 in.) diameter Grade 5 bolts (84). These bolts are designed to be sheared off by the downstream end (32) of the mandrel tubes (22), as illustrated in the axle breakaway sequence FIGS. 8A through 8D, thus, allowing the axle (86) to move forward freely. Two push tubes or axle accelerators (88), 914 mm (3 ft.) long and fabricated from 38 mm×38 mm (1.5 in.×1.5 in.)×11 gage thick tubes, are attached to the axle (86). These push tubes (88) are designed to engage the back side (90) of the front impact plate (20) as the impact head assembly (12) is pushed forward, thus allowing the breakaway axle assembly (18) to be pushed forward of the bursting process. The fenders (92) of the axle assembly (18) are designed as both restraints and guides to keep the breakaway axle assembly (18) moving along the energy absorbing tubes (64 and 70).

In FIG. 8A, the attenuator (10) is shown in a first non-impact position. It may be seen that the breakaway axle assembly (18) is attached to the underside (96) of the second energy absorbing tube (64). In FIG. 8B, a vehicle (100) has impacted the impact head assembly (12) and urged the mandrels (24) forward. The retaining bolt (50) has been sheared and the first energy absorbing tube (60) has been "ribboned" or burst apart. The mandrels are about to engage the connection flanges (63a and 63b). The tapered ends (32) of the mandrel tubes (22) are about to shear off the first axle bolts (84a). As the vehicle is being brought to a controlled stop in the sequence, it may be seen in FIG. 8C that the connection flanges have burst, the second energy absorbing tube (64) continues to ribbon, the second set of axle bolts (84b) have been sheared off, and the backside (90) impact head assembly (12) has contacted the push tubes or axle accelerators (88).

As the impact forces continues to urge the mandrels (24) through the energy absorbing tube, the impact head assembly (12) has pushed the axle assembly (18) forward. The fenders (92) have served as restraints to keep the axle assembly (18) aligned along the tubes (64).

Figure 9A:
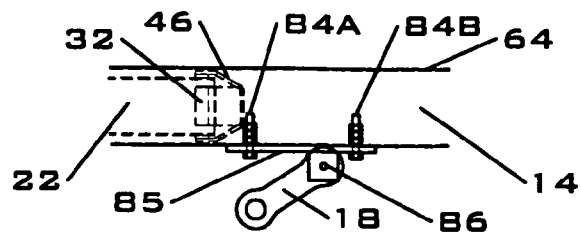
FIG. 9A illustrates the attachment of the breakaway axle assembly to the bursting tubular trailer frame member.

Should the impact continue to move forward, the mandrels (24) will eventually burst the third energy absorbing tubes (70), with the vehicle eventually stopping in a controlled deceleration FIGS. 9A-9G illustrate a number of alternative embodiments for attaching the breakaway axle assembly (18) to the bursting tubular trailer frame member (14). In FIG. 9A, the axle assembly (18) is attached to the frame member (14) by the axle (86) being affixed (welded) to an axle base plate (85). The axle base plate is bolted to the bursting tube (64) by bolt sets (84a and 84b). As the mandrel tube (22) moves through tube (64), the tapered end (46) impacts the bolts (84a and 84b) shearing them off thereby releasing the axle plate (85) from the frame (14). The axle assembly (18) is then free to move forward as it is pushed by the push rods or axle accelerators (88) and guided by the fenders (92).

Figure 9B:
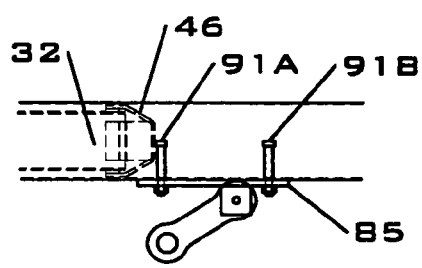
FIG. 9B is an illustration of an alternate embodiment of the axle assembly attachment mechanism.
Figure 9C:
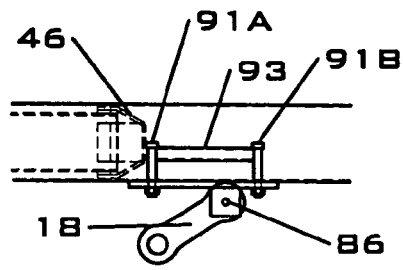
FIG. 9C shows a third embodiment of the axle assembly attachment mechanism.

FIG. 9B illustrates the use of shoulder bolts (91a and 91b) as the fastener holding the assembly (18) to the frame (14). In FIG. 9C a tie plate (93) extends between bolts (91a and 91b). When end (46) contacts the first bolt (91a) the impact force is transmitted to the second bolt (91b) allowing for a simultaneous shearing of the bolts (91a and 91b).

Figure 9D:
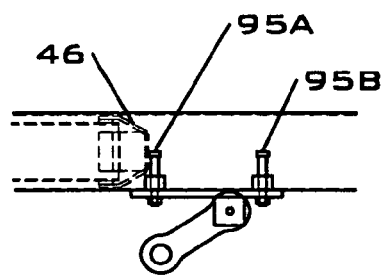
FIG. 9D shows a fourth embodiment of the axle assembly attachment mechanism.
Figure 9E:
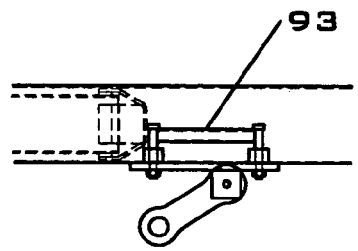
FIG. 9E shows a fifth embodiment of the axle assembly attachment mechanism.

FIGS. 9D and 9E show yet other embodiments of the axle release mechanism using a sleeve at the base of the bolt.

Figure 9F:
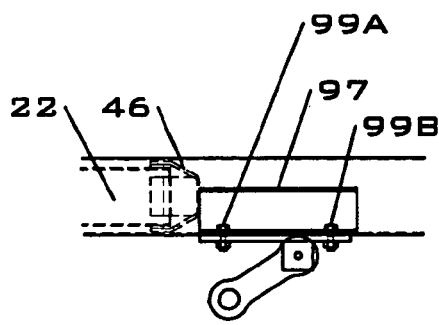
FIG. 9F shows a sixth embodiment of the axle assembly attachment mechanism.
Figure 9G:
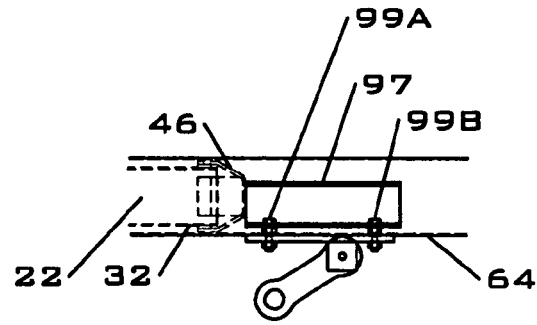
FIG. 9G shows a seventh embodiment of the axle assembly attachment mechanism.

FIGS. 9F and 9G illustrate the use of a connecting tube member (97) affixed within the bursting tube and connecting the bolts. When the connecting tube member (97) is struck by the tapered end (46) of the mandrel tube (22), tube member (97) is urged forward simultaneously shearing the bolts (99a and 99b).

Another important aspect of the present inventive attenuator system is illustrated in FIG. 2A. The trailer unit (10) is pivotally attached to a towing vehicle (112) at the vehicle's pintle hook (113) as the system slowly moves down a roadway. This configuration represents a unique arrangement of elements wherein the attenuator system is capable of handling offset impacts because of the interlocking impact head plate (20) on the impact head assembly (12). The engagement elements or protruded edges (27) and openings (29) in the impact plate (20) cooperate to act as a mechanical interlock with the impacting vehicle. Thus the present system incorporates an interlocking head assembly (12) with a bursting trailer frame member (14), a hinge assembly (16) in combination with a towing vehicle (112) to yield a mobile trailer mounted crash attenuation system.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

The invention claimed is:

1. A crash attenuation system comprising:
an impact head assembly connected to a first end of a trailer frame member having a hitch assembly at a second opposite end of said frame member; and a breakaway axle assembly mounted to said frame member by fasteners, wherein said trailer frame member comprises:
a first frame rail assembly generally parallel to and spaced apart from a second frame rail assembly, said first and second rail assemblies connected to one another at said second end of said frame member by said hitch assembly, said breakaway axle assembly further connecting said first and second rail assemblies when said impact head assembly is in a first position, said fasteners adapted to release said breakaway axle assembly from said frame member when said impact head assembly is in a second impacted position.

2. The system of claim 1 wherein each of said first and second frame rail assemblies comprises a plurality of energy absorbing sections.

3. The system of claim 1 wherein each of said first and second frame rail assemblies comprises:

a first energy absorbing section to dissipate a first level of impact energy;

a second energy absorbing section to dissipate a second level of impact energy; and a third energy absorbing section to dissipate a third level of impact energy.

4. The system of claim 3 wherein said second level of impact energy is dissipated through a first scored bursting tube portion and a second unscored bursting tube portion.

5. The system of claim 4 wherein said first energy absorbing section comprises a scored bursting tube portion.

6. The system of claim 5 wherein said scored bursting tube portion extends the entire length of said first energy absorbing section.

7. The system of claim 1 further comprising a fender assembly attached to said breakaway axle assembly for controlled guiding of the displacement of said axle assembly along a length of said trailer frame member upon a predetermined energy impact level to said impact head assembly.

8. The system of claim 1 wherein said hitch assembly has openings through which sand or salt may pass when said trailer frame member is attached to a towing vehicle.

9. The system of claim 1 wherein said impact head assembly comprises a mechanical interlock for engaging an impacting vehicle.

10. The system of claim 1 further comprising a signage unit attached to said trailer frame.

11. The system of claim 1 furthering comprising a replaceable first energy absorbing section attached to said first end of said trailer frame member.

12. The system of claim 1 wherein said hitch assembly is attachable to a fixed position object or barrier.

13. The system of claim 1 wherein said breakaway axle assembly is further attached to a member selected from the group consisting of a wheel set and a support post.

14. A crash attenuation system for use with a towing vehicle having a conventional pintle hook hitch member comprising:

an interlocking head assembly connected to a first end of a trailer frame member having a hitch assembly at a second opposite end of said frame member, said interlocking head assembly comprising an impact plate having a plurality of engagement members protruding from an impact face and adapted to mechanically interlock with an impacting vehicle to restrain said impacting vehicle from sliding along said impact face; said hitch assembly adapted to be attached to said pintle hook hitch member.

15. The system of claim 14 further comprising:

a breakaway axle assembly mounted to said frame member and adapted to release from said frame prior to said impacting vehicle directly impacting said breakaway axle assembly.

16. The system of claim 15 further comprising fender assemblies disposed on opposite sides of said frame adjacent said breakaway axle assembly and adapted to retain said breakaway axle assembly beneath said frame upon release of said breakaway axle assembly from said frame.

17. The system of claim 14 wherein said trailer frame member comprises a first frame rail assembly generally parallel to and spaced apart from a second frame rail assembly, said first and second rail assemblies connected to one another at said second end of said frame member by said hitch assembly, said breakaway axle assembly further connecting said first and second rail assemblies when said impact head assembly is in a first position.

18. The system of claim 17 wherein said hitch assembly comprises two diagonal hitch tubes attached to a cross member connecting said first and second rail assemblies to one another.

19. A crash attenuation system comprising:

an impact head assembly connected to a first end of a trailer frame member having a hitch assembly at a second opposite end of said frame member; and a breakaway axle assembly mounted to said frame member by fasteners adapted to release said breakaway axle from said frame member when said impact head assembly is moved from a first position to a second impacted position, wherein said breakaway axle assembly comprises:

an axle push rod assembly attached to a transverse axle member, said push rod assembly extending generally perpendicularly upstream of said transverse axle member, said axle push rod assembly adapted to urge said breakaway axle assembly when released from said trailer frame downstream toward said second opposite end of said frame member upon impact of said impact head assembly with said axle push rod assembly.

* * * * *